United States Patent [19]

Berger

[11] 4,022,149

[45] May 10, 1977

[54] THAW INDICATOR

[76] Inventor: Lee Berger, 9981 Wildwood Way, Villa Park, Calif. 95486

[22] Filed: Feb. 6, 1976

[21] Appl. No.: 655,689

[52] U.S. Cl. ............................ 116/114.5; 73/356; 73/358; 116/114 Y; 116/114 AB; 426/88
[51] Int. Cl.² ..................................... G01K 11/08
[58] Field of Search ...... 116/114.5, 114 AB, 114 Y, 116/114 V; 73/358, 356; 426/88

[56] References Cited

UNITED STATES PATENTS

| | | | |
|---|---|---|---|
| 2,277,278 | 3/1942 | Triplett | 73/358 |
| 2,460,215 | 1/1949 | Chase | 73/358 |
| 2,753,270 | 7/1956 | Direnzo | 116/114.5 |
| 2,755,665 | 7/1956 | Muncheryan | 73/343 B |
| 2,823,131 | 2/1958 | Power | 116/114.5 |
| 2,850,393 | 9/1958 | Romito | 116/114.5 |
| 2,951,764 | 9/1960 | Chase | 116/114.5 |
| 3,177,843 | 4/1965 | Geocaris | 116/114.5 |
| 3,437,070 | 4/1969 | Campbell | 73/358 |
| 3,702,077 | 11/1972 | Szabo | 73/356 |
| 3,786,777 | 1/1974 | Smith | 116/114 AB |

OTHER PUBLICATIONS

Food Industries; Ramstad et al., Dec. 1950, pp. 84, 184, 182.

*Primary Examiner*—S. Clement Swisher
*Assistant Examiner*—Denis E. Corr

[57] ABSTRACT

The thaw indicator is formed from a frangible capsule made of edible wax. A mixture of edible gelatin and colored water is sealed inside the capsule. The wax capsule is surrounded by a non-toxic blotter-like absorbant material which is coextensive with and in contact with the outer surface of the capsule. A time-delay for the thaw indicator is provided by adjusting the concentration of the gelatin and water mixture.

11 Claims, 7 Drawing Figures

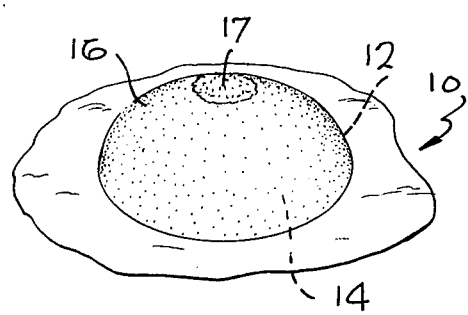
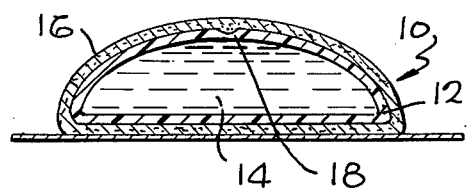
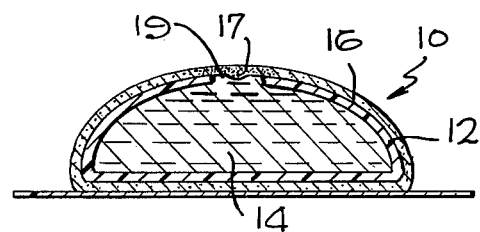
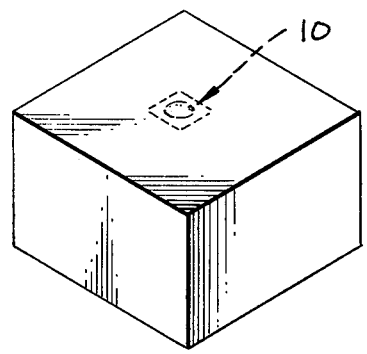
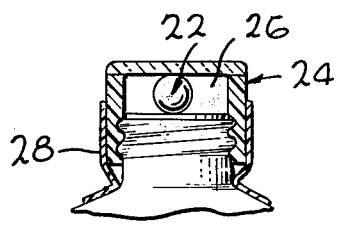
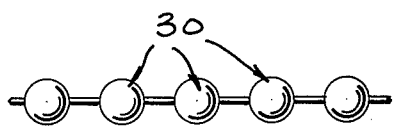
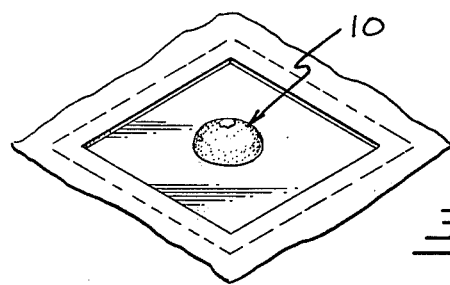

THAW INDICATOR

This invention relates generally to an indicator, and more particularly to a device for indicating when the contents of a frozen container have exceeded a predetermined temperature for a predetermined period of time.

BACKGROUND AND BRIEF SUMMARY OF THE PROBLEM

Many substances such as frozen food, medicine, or explosives, must be kept below a predetermined temperature because, if the temperature of the substances rises above a predetermined level for a predetermined period of time, the substances can deteriorate sharply in quality and become dangerous. This is particularly true of food and medicines. In the case of food, spoilage is quite rapid when the temperature of the food is at or near the melting point of water. However, circumstances can arise where, for example, because of a power failure in a refrigerating device, the temperature of the frozen food rises above the predetermined level for a predetermined period of time, then after the power is restored, the temperature again falls. In the meantime there might have been a serious deterioration in the quality of the food or the safety of the material that has been subjected to a rising temperature. In such a situation, it is important to be able to know whether or not the temperature of the substance has exceeded a predetermined level for the predetermined period of time.

To prevent this from happening, a great many thaw indicators have been devised. Those previously constructed usually involved a device of some sort which broke upon freezing and when the temperature of the device rose above a predetermined level, the contents of the indicators caused a visible stain or color change, which indicated the temperatures of the substance exceeded the limits set for it.

There were, however, certain problems associated with thaw indicators previously constructed. For one thing, they were not made of edible substances. This created safety problems when the packages were used in places, such as the home, where children could be attracted to the indicator and eat it, particularly if the color change resembled the color of food or candy.

In addition, previous thaw indicators were often attached to the package in such a way that in the event that the temperature of the package rose above the proscribed limit, causing the indicator to function, a merchant might be able to simply remove the thaw indicator and replace it with one which had not yet functioned in order to sell the package.

Accordingly, an important object of this invention is to provide a thaw indicator which is made entirely from edible and non-toxic substances.

A further object of this invention is to provide a thaw indicator for use on a package of frozen foods to indicate that the package has been subject to an unsafe temperature for a predetermined period of time.

Yet another object of this invention is to provide a thaw indicator which cannot be reset after it functions.

Still a further object of this invention is to provide a thaw indicator which can be made very tiny, so it can be mounted inside packages and medicine boxes.

These and other objects of this invention will become more apparent when better understood in the light of the accompanying specification and drawings, wherein:

FIG. 1 is a perspective view of the thaw detector constructed according to the principals of this invention.

FIG. 2 is an elevational view of the thaw indicator before it has been subjected to thawing temperatures.

FIG. 3 is an elevational view of the thaw indicator after it has been subjected to thawing temperatures.

FIG. 4 is a perspective view of the indicator mounted inside the wrapping of a package.

FIG. 5 is an enlarged perspective view of the indicator shown in FIG. 4.

FIG. 6 is an elevational view of the thaw indicator showing the thaw indicator mounted inside a medicine bottle cap.

FIG. 7 is an elevational view of a plurality of thaw indicators mounted together in a bead-like configuration.

Referring now to FIG. 1 of the drawings, a thaw indicator indicated generally by the reference numeral 10, comprises a capsule 12 formed from an edible wax. A capsule is substantially filled by a mixture of edible gelatin and a colored liquid, such as colored water 14. The capsule is surrounded by a non-toxic blotter like absorbent material 16 which is coextensive and in contact with at least a substantial portion of the outer surface 12. A weak point 18 may be formed in the capsule for reasons to be described below. The edible wax forming the capsule 12 is selected so its melting point is at least at pasteurization temperature, so that when the capsule is formed with the mixture of gelatin and water inside, the liquid contents will be pasteurized.

In operation, the thaw indicator 10 is mounted on a package which must be kept frozen or it will deteriorte if the temperature of the contents rises above a predetermined level for a predetermined period of time. When the thaw indicator is frozen, along with the package, the mixture of gelatin and colored water expands enough so it cracks the edible wax capsule. If the capsule is provided with a weak point 18, see FIG. 2, the capsule will first break at this weak point, see FIG. 3, and the weak point is surrounded by the absorbent material 16. While the mixture of gelatin and colored liquid is frozen, it can not be absorbed by the blotter-like absorbent material 16. However, when the temperature of the package rises above the pre-determined level for a predetermined period of time, the mixture melts and since the capsule has been cracked, the colored mixture is absorbed by the blotter-like material 16 over the crack, staining it and providing a non-reversible indication that the contents of the package has been subjected to dangerous temperatures for a predetermined period of time.

It is noted that occasions might arise where the temperature rise at the surface does not cause a deterioration of the material because the elevation of the temperature does not last long enough to warm the contents of the package. The period of time the package may remain at an elevated temperature without deterioration is dependent on a number of factors, such as the size of the package, its composition, the composition of the material, and the temperature. Consequently, the thaw indicator must be provided with a time-delay which can be adjusted in accordance with the requirements of the package, so that the thaw indicator only functions when the temperature of the package has risen above the predetermined level for a predetermined period of time which has been determined to be critical for that particular kind of package. This time delay can be conveniently adjusted by varying the concentration of edible gelatin in water. When the concentration is increased, it takes longer for the mixture in the capsule to melt and seep through the cracks in the capsule to stain the blotter-like material 16.

Since the time delay comprising the mixture of gelatin and colored liquid is inside the capsule, the thaw indicator can be made much smaller than would otherwise be possible. This makes it convenient to mount the indicator inside of a package which is covered by a transparent material and permits the indicator to be heat-sealed to the inner surface of the transparent wrapper, see FIG. 4 and FIG. 5. In this way, if the temperature of the package rises above this predetermined level, causing the mixture inside the capsule to break to stain the blotter-like material, it would be difficult and time-consuming and usually uneconomical for a merchant to unwrap the package to remove the colored capsule and replace it by another thaw indicator to conceal the evidence that the package has been subjected to unsafe temperatures, and then rewrap the package.

Some medicines or other chemicals must be kept frozen to prevent deterioration or explosion. Consequently, the thaw indicator might be mounted inside of a bottle cap 20, see FIG. 6. Since the thaw indicator is provided with an internal time delay, it can be made very small, and if it is spherical, the size of the thaw indicator could be minimized. Except for shape, the spherical thaw indicator 22 shown in FIG. 6 is constructed like the thaw indicator shown in FIG. 1. As seen in FIG. 6, at least part of the bottle cap 24 is made of a generally transparent material. This bottle cap is provided with a sealed chamber 26 in which the thaw indicator is mounted. To prevent replacement of the bottle cap, in the event the bottle has been subjected to unsafe temperatures, the bottle cap may be attached to the bottle by a plastic sealing material 28.

Some packages contain a variety of separate materials, each of which deteriorates at its own rate when subjected to temperatures above a pre-determined level which persist for predetermined periods of time. In such a case, the package could have a plurality of individualized thaw indicators attached thereto. The thaw indicators 30, shown in FIG. 7, utilize the spherical shape of the thaw indicator shown in FIG. 6 and comprise a plurality of separate thaw indicators which may be strung together in a bead-like fashion. Each individual thaw indicator contains a particular mixture of gelatin and a colored liquid such as water. However, the colors of the mixtures are all different, and the concentrations of the mixture of gelatin and colored liquid are all selected in accordance with the requirements of the various materials inside the package. In this way, if the temperature of the package should rise above a predetermined level for a predetermined period of time, and then re-frozen, one could, by inspecting the various bead-like thaw indicators, estimate how long the various mixtures remained above the unsafe temperatures, and in addition, discard only the materials in the package which had been rendered unsafe.

Having described the invention, what I claim as new is:

1. A thaw indicator comprising a frangible capsule formed from an edible wax material, a mixture of gelatin and colored liquid inside the capsule, an outer cover of non-toxic absorbent material surrounding at least a portion of the outer surface of said capsule and in contact therewith, whereby when said thaw indicator is frozen, said mixture expands and breaks said capsule and when thereafter the temperature of said thaw indicator rises above a predetermined level for a predetermined period of time, the mixture melts and is absorbed by and stains said absorbent material to provide an indication that the material has been subjected to unsafe temperatures for an excessive period of time.

2. The indicator described in claim 1 wherein said capsule is constructed with a weak point, the outer surface of said capsule by said weak point in contact and surrounded by said absorbent material, whereby on freezing, the expanding material cracks said capsule at said weak point to insure contact of said mixture with said absorbent material.

3. The thaw indicator described in claim 1 wherein said edible wax capsule is formed from a wax whose melting point is high enough so that the contents of the thaw indicator can be pasturized during its fabrication so that ingestion of the thaw indicator is not injurious.

4. The thaw indicator described in claim 1, whereby the concentration of the mixture of gelatin and colored liquid can be varied so the time required for the mixture to melt when subject to temperatures above a predetermined level can be varied to provide the thaw indicator with an internal time delay.

5. A package covered by a transparent wrapping material, a thaw indicator heat-sealed to the inner surface of said wrapping material, said indicator comprising a frangible capsule formed from an edible wax material, a mixture of gelatin and colored liquid inside the capsule, an outer surface of non-toxic absorbent material surrounding at least a portion of the outer surface of said capsule, whereby when said thaw indicator is frozen, said mixture expands and breaks said capsule, and when thereafter the temperature of said package and said capsule rises and remains above a predetermined level for a predetermined period of time, said mixture melts and is absorbed by and stains said absorbent material to provide an indication that the package has been subjected to excessive temperature for an excessive period of time.

6. The thaw indicator described in claim 5 wherein said capsule is constructed to have a weak point, the outer surface of said capsule by said weak point surrounded by and in contact with said absorbent material whereby, on freezing, the expanding material cracks said capsule at said weak point to insure contact of said melting mixture with said absorbent material.

7. A bottle cap formed at least in part from a transparent material, said bottle cap having a sealed chamber formed therein, visible through said transparent material and a thaw indicator mounted inside the bottle cap, said thaw indicator formed from a generally spherical edible wax capsule, a mixture of gelatin and colored liquid inside said capsule, an outer cover of non-toxic absorbent material surrounding at least a portion of the outer surface of said edible wax capsule and in contact therewith whereby when said thaw indicator is frozen, said mixture expands and breaks said capsule, and when thereafter the temperature of said bottle cap and said thaw indicator rises above a predetermined level for a predetermined period of time, the mixture melts and is absorbed by and stains said absorbent material, to provide an indication that the bottle cap has been subjected to an excessive temperature for an excessive period of time.

8. The bottle cap described in claim 7, wherein a tough plastic material is attached to said bottle cap and adapted to be attached to a bottle.

9. The thaw indicator described in claim 7, wherein said wax capsule is formed with a weak point, said absorbent material surrounding at least the outer surface of the capsule and in contact therewith around the weak point, whereby when the capsule is frozen, it breaks on said weak point, and the break occurs where the capsule is in contact with the absorbent material, so that on melting, the melting liquid is absorbed by and stains said absorbent material.

10. A thaw indicator comprising a plurality of thaw indicators, each thaw indicator having a different concentration of gelatin in a differently colored liquid associated with an absorbent material whereby each separate thaw indicator contains a mixture which melts and stains said absorbent material when subjected to temperature above a predetermined level for a separate period of time, so that when said thaw indicators are associated with a package which has been subjected to a temperature rise above a predetermined level for a predetermined period of time, an inspection of the thaw indicators provides a basis for estimating the period of time the package has been subjected to elevated temperatures, said thaw indicators attached together.

11. A thaw indicator comprising a plurality of thaw indicators, each thaw indicator having a different concentration of gelatin in a differently colored liquid associated with an absorbent material whereby each separate thaw indicator contains a mixture which melts and stains said absorbent material when subjected to temperature above a predetermined level for a separate period of time, so that when said thaw indicators are associated with a package which has been subjected to a temperature rise above a predetermined level for a predetermined period of time, an inspection of the thaw indicators provides a basis for estimating the period of time the package has been subjected to elevated temperatures, said thaw indicators being generally spherical in shape and strung together in a bead-like configuration.

* * * * *